Sept. 3, 1935.  U. MEININGHAUS  2,012,967
METHOD AND APPARATUS FOR OBTAINING A PRESSURE MEDIUM
Filed Jan. 16, 1933
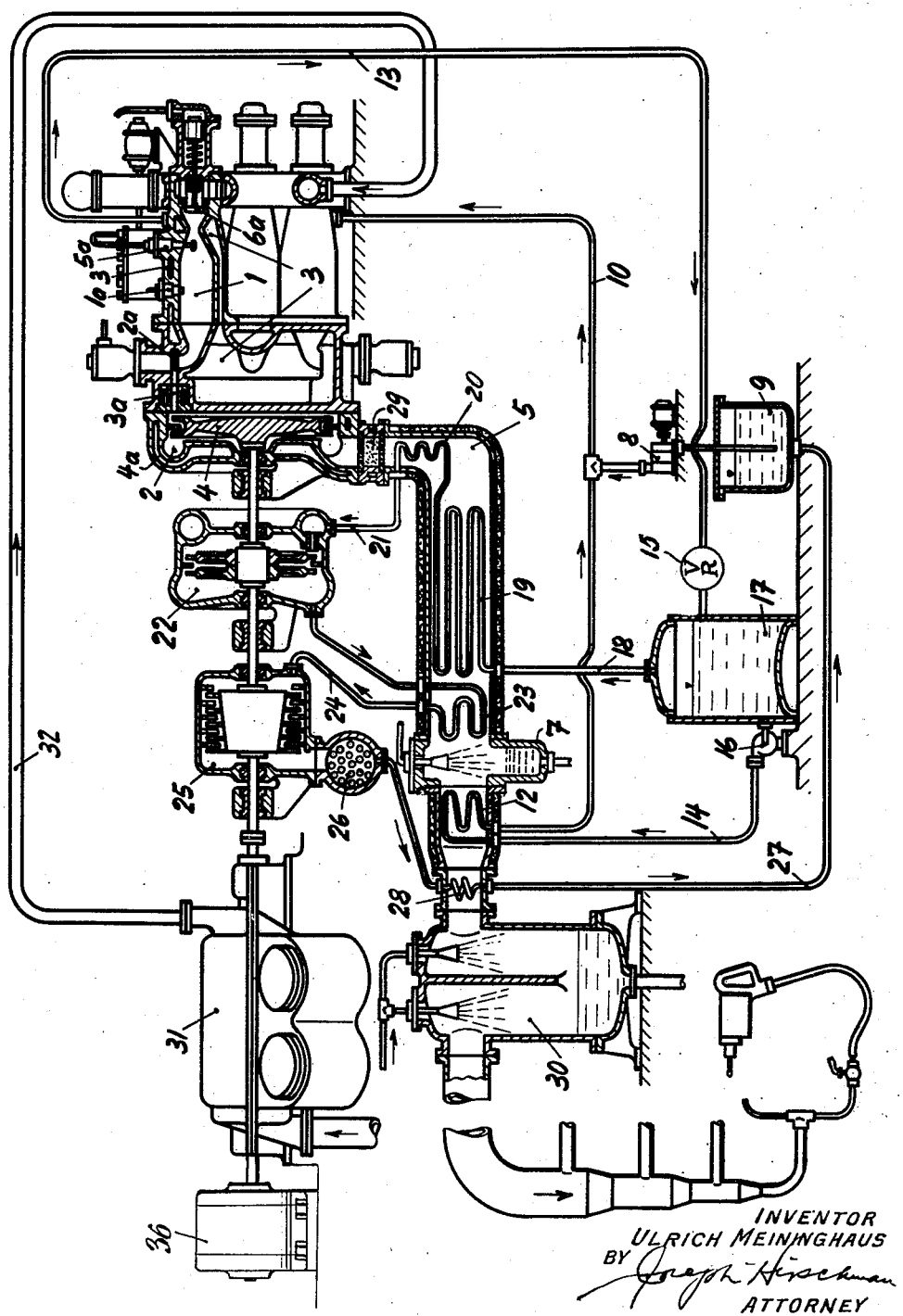
INVENTOR
ULRICH MEININGHAUS
BY
ATTORNEY Patented Sept. 3, 1935

2,012,967

UNITED STATES PATENT OFFICE 2,012,967

METHOD AND APPARATUS FOR OBTAINING A PRESSURE MEDIUM

Ulrich Meininghaus, Mulheim-Ruhr, Germany, assignor to The Holzwarth Gas Turbine Company, San Francisco, Calif., a corporation of Delaware Application January 16, 1933, Serial No. 651,980
In Germany February 9, 1932

12 Claims. (Cl. 60—49)

The present invention relates to the production of a fluid medium under elevated pressure suitable, among other uses, for the transmission of power to remote points or to regions where the use of other media, such as electricity, is not safe or desirable.

It is the object of the invention to provide a novel and improved method and apparatus for producing in a simple and economical manner a gaseous medium under high pressure which can be used in the same manner in which compressed air has heretofore been employed.

My invention is based upon the discovery that constant volume explosion turbines, in contrast with piston explosion engines and continuous combustion, constant pressure turbines are peculiarly suited for the economical production of a pressure medium in the form of high pressure exhaust gases. This important distinction is due to the fact that with explosion turbines the high pressure at which the combustion gases must be conducted for the transmission of energy can be attained without difficulty by suitable adjustment of the counter pressure of the explosion turbine without producing the harmful reaction upon the driving mechanism, which is unavoidable with piston engines, or a reduction in the efficiency, which destroys the economy of constant pressure turbines.

According to the present invention, the pressure medium which is to serve for remote power transmission in the manner of compressed air, is produced in constant volume explosion turbine plants in the form of explosion gases under pressure. As the excess heat of the explosion gases can be withdrawn therefrom for useful purposes in any known or suitable way before the gases are conveyed to a distant point, the loss of heat during such conveyance of the pressure gases can be reduced to any desired, arbitrarily adjustable degree.

The economy of my new process becomes evident by contrast with the production of compressed air, as in the latter case the required elevated pressure must be created by mechanically reducing the size of air-filled spaces, that is, by the expenditure of quite considerable amounts of mass and friction energy, whereas according to the invention such elevated pressure is attained with a decisive limitation in the amount of negative work done due mainly to the fact that the explosion process, with its known high efficiency, is utilized.

The transmission of energy with compressed air having demonstrated its advantages and economy in many fields of use, this mode of energy transmission is advanced to a considerable degree by the present invention which makes it possible to produce working gases under high pressure in a manner which is considerably more economical than the production of compressed air. By the present invention, not only is the cost of manufacture of the pressure medium reduced, but the installation of the remote conduits (the pipe system) can be accomplished more cheaply as by my improved process it is possible to increase the pressure at which the medium is transmitted in an economical manner. In this connection, the same considerations apply as in the case of increase of the tension in electrical power transmission.

The combustion gases of an explosion turbine naturally contain, as do all combustion gases, a certain quantity of carbon monoxide, which however is so small that the expanded gases discharged into the atmosphere surrounding the machine in which the compressed gases are used produce no danger to health because of their strong dilution. If, however, the working space is limited, as in mines, the combustion gases can be freed of their carbon monoxide content by the use of suitable cleaning or scrubbing devices or through suitable catalyzers. In such case the purification of the gases preferably takes place where the gases have as high a temperature as possible, that is, directly after leaving the explosion turbine. The other undesired components of the combustion gases can of course likewise be removed, particularly the acid anhydrides, for example, by the arrangement of scrubbers in the path of the gases. The removal of such acid anhydrides is preferably effected before the saturation temperature of the water vapor contained in the exhaust gases is reached.

The apparatus for carrying out the present invention comprises primarily a constant volume explosion turbine from whose exhaust gases all, or practically all, of the available heat is withdrawn whenever the gases under pressure are not to be employed at the high temperature under which they exhaust from the explosion turbine. The withdrawal of the heat is effected before the gases under pressure are conveyed to the place of use, such heat being utilized in any suitable manner, for example, for preheating water and for generating and superheating steam. The explosion turbine can be made to operate the compressor which produces the compressed air required for generating the explosion gases. The waste heat abstracted by cooling the walls of the explosion turbine can likewise be utilized to operate the compressor. If the compressor delivers more air than is required for the operation of the explosion plant, the excess air may be used in any suitable manner. The excess energy of the explosion turbine plant can also be delivered to power-driven machines, such as generators, pumps, etc. The heat abstracted from the explosion turbine by the cooling agent thereof can be utilized in known manner for the generation of steam, the heat contained in the exhaust gases being utilized first for steam superheating and subsequently for the preheating of water. The steam superheating may consist in the superheating of the fresh steam and in at least a single intermediate superheating following such first superheating.

The accompanying drawing shows by way of example an apparatus for carrying out the process according to the invention.

In said drawing, the numeral 1 indicates the constant volume explosion chambers of an explosion turbine, the general construction of which is known. A combustible charge is formed periodically within each of the chambers 1 by the admission of air under pressure through a charging valve 6a and of fuel through a fuel inlet valve or nozzle 5a. The explosive mixtures are ignited at the proper instants by igniters 1a, which may be in the form of spark plugs, and when combustion is complete the explosion gases of high temperature and pressure are discharged through the nozzle or outlet valve 2a. After partial expansion in the nozzles 3a the gases are directed against the rotor 4 of the explosion turbine. The exhausting puffs of gases are collected in the exhaust space 2 and then pass through a body of material 29 which causes oxidation of the carbon monoxide to carbon dioxide, or adsorbs or absorbs or combines with the monoxide, all of which procedures are known. Thus the material 29 may comprise platinum or a metal oxide which, as is known (see the patents to Titlestad 1,927,508; Riehm 1,766,945; and Frazer 1,789,812) effects catalytic oxidation of carbon monoxide to carbon dioxide (the combustion gases contain excess free oxygen), the platinum or oxide being suitably supported upon a heat-resisting material such as asbestos or fireclay. The gases then flow into the conduit 5. The counter pressure prevailing in the space 2 corresponds approximately to the pressure at which the combustion gases are to be conducted to the tap points in the distant pipe line. All of the explosion chambers 1 are surrounded by pressure-proof cooling jackets 3; the exhaust chamber 2 is likewise surrounded by a pressure-proof jacket 4a. A conduit 10 conducts to the cooling spaces within the jackets a current of water under pressure which has preferably been preheated, such water being withdrawn by pipe 13 after abstracting heat from the gas-contacted walls of the plant. A pressure-reducing valve 15 is arranged in advance of the pressure water reservoir 17, so that steam is generated within such reservoir from the highly heated water under pressure. The steam is conducted by conduit 18 to the superheaters 19 and 20 arranged in series in the gas conduit 5. The superheated steam is withdrawn by a pipe 21 and first does work in the high pressure steam turbine 22; after being superheated in the superheater 23, the steam is conducted by a pipe 24 to the low pressure condensing steam turbine 25 where it is expanded down to condenser pressure. The water precipitated in the condenser 26 is conducted to a preheater 28 likewise arranged in the exhaust gas conduit 5 and is then conducted to the supply tank 9. A pressure pump 8 sucks water from the tank 9 and forces the same under pressure into the conduit 10 from which it flows into the cooling jackets of the explosion turbine. The pressure pump 16 sucks the water which has not been vaporized in the reservoir 17 and forces the same under pressure into conduit 10 through pipe 14, preheater 12 and conduit 11.

Scrubbers 30 and 7 are arranged in the exhaust gas conduit 5 for removing the acid anhydrides, such as carbon dioxide and sulfur dioxide. The scrubber 7 is so arranged that the greater part of the acid anhydrides is removed before the saturation temperature of the water vapor contained in the exhaust gases is reached; the scrubber 30 serves for removing the remainder of the acid anhydride which was not previously removed. The washing medium in both scrubbers may be water under pressure, the water being atomized and dissolving out the carbon dioxide, sulfur dioxide and other soluble acid anhydrides. This water can be reused after removal of the dissolved material or it can be replaced with fresh water. The use of water in gas scrubbers is well-known and they need not be discussed in further detail.

It will be seen from the above that in the plant illustrated there is effected a substantially complete abstraction of the available heat of the combustion gases; that is, the temperature of the gases is reduced as far as practicable to that of the atmosphere. However, if desired, only part of the heat may be abstracted from the gases. The conduit 5 discharges at the point 30 a completely harmless and inert gas which is approximately at the exhaust pressure of the turbine 4 and is available for distant power transmission in the manner of compressed air.

In the form of the invention illustrated by way of example, the gas turbine 4 and the steam turbines 22 and 25 are mounted on the same shaft and drive the compressor 31 which feeds compressed air to the explosion chambers through the pipe 32.

Power in excess of that required to operate the compressor and auxiliary devices may be absorbed by a generator 36.

Various modifications of the structure illustrated may be resorted to within the scope of the appended claims without departing from the spirit of the invention.

I claim:

1. The method of generating a compressed medium for a pneumatically operated device, which comprises exploding compressed air and fuel under constant volume at any suitable place and thereby obtaining gase at a multiple of the pressure of the compressed air and capable of producing power in excess of that required to compress the air, partially expanding the gases and compressing air with the energy so liberated, abstracting heat from the gases until the latter are at approximately atmospheric temperature and utilizing such heat for the generation of power, and conducting the gases to the pneumatic device for use therein.

2. The method of generating a compressed medium for a pneumatically operated device, which comprises exploding compressed air and fuel under constant volume at any suitable place and thereby obtaining gases at a multiple of the pressure of the compressed air and capable of producing power in excess of that required to compress the air, partially expanding the gases to increase their velocity and compressing air for the explosion with the kinetic energy of the gases, abstracting heat from the still hot, pressure gases until the latter are at approximately atmospheric temperature and utilizing such heat for the generation of power, and then conducting the gases to the pneumatic device for use therein.

3. The combination with a pneumatically operated device, of apparatus for supplying such pneumatically operated device with a pressure fluid from a remote point, comprising one or more constant volume explosion chambers, means for charging said chambers periodically with compressed air and fuel for explosion therein to generate gas at a multiple of the pressure of the compressed air and capable of producing power in excess of that required to compress the air, a turbine arranged to receive the gases discharging periodically from said chamber or chambers, said turbine adapted to operate with a super-atmospheric back pressure and the gases expanding only partially in said turbine, a collecting chamber arranged to receive the pressure gases discharging from said turbine, means for abstracting heat from the gases to substantially the greatest economical degree, power-generating mechanism operated by the so-abstracted heat, an air compressor driven by at least one of the power devices consisting of said turbine and said mechanism, and a conduit for conducting the pressure gases to the pneumatically operated device.

4. Apparatus as set forth in claim 3, wherein the heat-abstracting means comprises heat exchanger apparatus arranged in the path of the explosion gases after the turbine and adapted to cool the same down to approximately atmospheric temperature.

5. Apparatus as set forth in claim 3, including means arranged in the path of the gases for purifying the same of noxious components to adapt them for use with pneumatic devices located in confined spaces.

6. The combination with a distributing system for compressed gas to be supplied to pneumatically operated means in the manner of compressed air, of apparatus for generating said compressed gas comprising a constant volume explosion chamber, means for introducing compressed air and fuel into said chamber for explosion therein under constant volume, whereby gases are obtained at a multiple of the pressure of the compressed air and capable of producing power in excess of that required to compress the air, a nozzle arranged to receive the gases discharging periodically from said chamber, said nozzle adapted to expand the gases partially against a super-atmospheric back pressure, apparatus arranged to receive the partially expanded gases of increased velocity and to abstract a part of the available energy of the gases for the generation of power, means for abstracting heat from said gases and transmitting such heat to a liquid for the generation of vapor, an engine driven by said vapor, an air compressor driven by said engine, and means for conducting the cooled gases under pressure to said distributing system.

7. The improvements in the art of supplying a pneumatic distributing system with a fluid pressure medium for distribution to pneumatically operated apparatus, which comprises generating the pressure medium by the explosion of compressed air and fuel under constant volume and thereby obtaining gases at a multiple of the pressure of the compressed air and capable of producing power in excess of that required to compress the air, partially expanding the gases and utilizing the liberated energy to compress such air, abstracting heat from the gases and utilizing such heat likewise to compress said air, and conveying the cooled gases under pressure to a remote pneumatic distributing system.

8. The method according to claim 7, including the step of removing the noxious components of the gases before the latter are conveyed to said distributing system.

9. The method according to claim 7, wherein the noxious components of the gases are removed and the gases cooled to approximately atmospheric temperature, in either order, before they are conveyed to said distributing system.

10. The combination with a distributing system for compressed gas to be supplied to pneumatically operated means in the manner of compressed air, of apparatus for generating said compressed gas comprising a constant volume explosion chamber, means for introducing fuel and air under pressure into said chamber for explosion therein under constant volume, whereby gases are obtained at a multiple of the pressure of the compressed air and capable of producing power in excess of that required to compress air, a turbine arranged to receive the gases discharging periodically from said chamber, said turbine adapted to operate with a superatmospheric back pressure and the gases expanding only partially in said turbine, means for abstracting heat from said gases and transmitting such heat to water for generating steam, a steam engine driven by said steam, an air compressor driven by said turbine and by said steam engine, and means for conducting the cooled gases under pressure to said distributing system.

11. The combination according to claim 10, wherein said heat-abstracting means is constructed to cool the gases to approximately atmospheric temperatures.

12. The combination according to claim 10, including means for removing the noxious components of the gases before they are introduced into the distributing system.

ULRICH MEININGHAUS.